US009569244B2

(12) United States Patent
Challa et al.

(10) Patent No.: US 9,569,244 B2
(45) Date of Patent: *Feb. 14, 2017

(54) IMPLEMENTING DYNAMIC ADJUSTMENT OF I/O BANDWIDTH FOR VIRTUAL MACHINES USING A SINGLE ROOT I/O VIRTUALIZATION (SRIOV) ADAPTER

(71) Applicant: International Business Machines Corporation, Armonk, NY (US)

(72) Inventors: Narsimha R. Challa, Hyderabad (IN); Charles S. Graham, Rochester, MN (US); Swaroop Jayanthi, Bangalore (IN); Sailaja R. Keshireddy, Hyderabad (IN); Adam T. Stallman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 14/628,210

(22) Filed: Feb. 20, 2015

(65) Prior Publication Data

US 2016/0019176 A1 Jan. 21, 2016

Related U.S. Application Data

(63) Continuation of application No. 14/332,482, filed on Jul. 16, 2014.

(51) Int. Cl.
G06F 9/455 (2006.01)
G06F 13/362 (2006.01)
H04L 12/24 (2006.01)

(52) U.S. Cl.
CPC ....... *G06F 9/45558* (2013.01); *G06F 13/3625* (2013.01); *G06F 9/45533* (2013.01);
(Continued)

(58) Field of Classification Search
CPC ........ G06F 9/455; G06F 9/5077; G06F 9/485; H04L 49/70
See application file for complete search history.

(56) References Cited

U.S. PATENT DOCUMENTS 8,060,875 B1 11/2011 Lambeth
8,503,468 B2 8/2013 Akyol et al.
(Continued)

FOREIGN PATENT DOCUMENTS

EP 2362578 A1 8/2011

OTHER PUBLICATIONS

Ahn, S. W. et al. "Isolation Schemes of Virtual Network Platform for Cloud Computing". 2012. TIIS, 6(11), 2764-2783.*
(Continued)

*Primary Examiner* — Lewis A Bullock, Jr.
*Assistant Examiner* — Gilles Kepnang
(74) *Attorney, Agent, or Firm* — Joan Pennington (57) ABSTRACT

A method, system and computer program product are provided for implementing dynamic adjustment of Input/Output bandwidth for Virtual Machines of a Single Root Input/Output Virtualization (SRIOV) adapter. The SRIOV adapter includes a plurality of virtual functions (VFs). Each individual virtual function (VF) is enabled to be explicitly assigned to a Virtual Machine (VM); and each of a plurality of VF teams is created with one or more VFs and is assigned to a VM. Each VF team is enabled to be dynamically resizable for dynamic adjustment of Input/Output bandwidth.

10 Claims, 10 Drawing Sheets (52) U.S. Cl.
CPC .............. *G06F 2009/45579* (2013.01); *G06F 2009/45595* (2013.01); *H04L 41/00* (2013.01)

(56) References Cited

U.S. PATENT DOCUMENTS

| | | |
|---|---|---|
| 9,047,208 B1 | 6/2015 | Moore et al. |
| 9,213,564 B1* | 12/2015 | Klein .................. G06F 9/45558 |
| 2008/0056120 A1 | 3/2008 | Jha et al. |
| 2008/0304519 A1 | 12/2008 | Koenen et al. |
| 2009/0133028 A1* | 5/2009 | Brown .................. G06F 13/385 |
| | | 718/104 |
| 2009/0222558 A1* | 9/2009 | Xu .......................... G06F 9/485 |
| | | 709/224 |
| 2010/0115174 A1 | 5/2010 | Akyol et al. |
| 2010/0287455 A1* | 11/2010 | Tripathi .............. G06F 9/45558 |
| | | 714/807 |
| 2010/0290467 A1 | 11/2010 | Eisenhauer et al. |
| 2012/0005521 A1* | 1/2012 | Droux ................ G06F 11/2005 |
| | | 714/4.11 |
| 2012/0016970 A1 | 1/2012 | Shah et al. |
| 2012/0102217 A1 | 4/2012 | Cardona et al. |
| 2012/0131201 A1* | 5/2012 | Matthews ........... G06F 13/4081 |
| | | 709/226 |
| 2012/0131590 A1* | 5/2012 | Brownlow ............ G06F 9/5077 |
| | | 718/104 |
| 2012/0166690 A1 | 6/2012 | Regula |
| 2012/0167085 A1* | 6/2012 | Subramaniyan ...... G06F 13/105 |
| | | 718/1 |
| 2012/0185853 A1 | 7/2012 | Haviv et al. |
| 2012/0246644 A1 | 9/2012 | Hattori et al. |
| 2013/0254767 A1* | 9/2013 | Mizuno .................. G06F 9/455 |
| | | 718/1 |
| 2014/0006676 A1* | 1/2014 | Chandrasekhar ....... G06F 13/36 |
| | | 710/316 |
| 2014/0007230 A1 | 1/2014 | Jani et al. |
| 2014/0025777 A1 | 1/2014 | Spencer |
| 2014/0050091 A1 | 2/2014 | Biswas et al. |
| 2014/0059160 A1* | 2/2014 | Chernoff ................. H04L 49/70 |
| | | 709/217 |
| 2014/0059265 A1* | 2/2014 | Iyer ........................ G06F 9/5011 |
| | | 710/313 |
| 2014/0173600 A1 | 6/2014 | Ramakrishnan Nair |
| 2014/0208317 A1 | 7/2014 | Nakagawa |
| 2014/0245300 A1 | 8/2014 | Clegg et al. |
| 2015/0254093 A1* | 9/2015 | Ho ...................... G06F 9/45558 |
| | | 718/1 |

OTHER PUBLICATIONS

Surabhi, Vivek. "Designing with SR-IOV Capability of Xilinx Virtex-7 PCI Express Gen3 Integrated Block." 2013.*

Muench, Daniel, et al., "Hardware-Based I/O Virtualization for Mixed Critically Real-Time Systems Using PCIe SR-I0V," Computational Science and Engineering (CSE), 2013 IEEE 16th International Conference, IEEE, 2013.

"Broadcom Ethernet Network Controller Enhanced Virtualization Functionality", pp. 1-10, Broadcom, Oct. 2009.

KR Kandavel et al., "MGT357-Deep Dive into Windows Server 2012 Hyper-V & System Center 2012 SP1-VMM (Part 2)", pp. 1-47, Microsoft, 2013.

* cited by examiner

IMPLEMENTING DYNAMIC ADJUSTMENT OF I/O BANDWIDTH FOR VIRTUAL MACHINES USING A SINGLE ROOT I/O VIRTUALIZATION (SRIOV) ADAPTER

This application is a continuation application of Ser. No. 14/332,482 filed Jul. 16, 2014.

FIELD OF THE INVENTION

The present invention relates generally to the data processing field, and more particularly, relates to a method, system and computer program product for implementing dynamic adjustment of Input/Output bandwidth for Virtual Machines using a Single Root Input/Output Virtualization (SRIOV) adapter using resizable Virtual Function (VF) Teams, for example, in Software Defined Data Centers (SDDC).

DESCRIPTION OF THE RELATED ART

Different Virtual Machines (VMs) running on a Virtualization Platform have different I/O bandwidth requirements due to the nature of applications they run. Also, it is possible that different VMs may reach their peak I/O bandwidth at different points in time. This will cause different VMs to have different I/O bandwidth requirements at different points of time.

Single root input/output (IO) virtualization (SRIOV) is a PCI standard, providing an adapter technology building block for I/O virtualization within the PCI-Express (PCIe) industry. Single root input/output (IO) virtualization (SRIOV) was developed by the industry PCI Special Interest Group as the basis of splitting a physical Host Bus Adapter (HBA) into multiple virtual HBAs. The PCI technology only deals with describing a host bus level access to one Physical Function (PF) and multiple Virtual Functions (VFs). For each Physical Function, multiple Virtual Functions (VFs) can be created up to an implementation dependent maximum. The VFs associated with a single PF can then be assigned to multiple different VMs (Virtual Machines) running on a Virtualized Platform. This SRIOV technology does not describe any HBA APIs or Models and is an emerging technology.

A need exists for an effective mechanism to enable dynamic adjustment of Input/Output bandwidth for Virtual Machines using a Single Root Input/Output Virtualization (SRIOV) adapter.

SUMMARY OF THE INVENTION

Principal aspects of the present invention are to provide a method, system and computer program product for implementing dynamic adjustment of Input/Output bandwidth for Virtual Machines using a Single Root Input/Output Virtualization (SRIOV) adapter. Other important aspects of the present invention are to provide such method, system and computer program product substantially without negative effects and that overcome many of the disadvantages of prior art arrangements.

In brief, a method, system and computer program product are provided for implementing dynamic adjustment of Input/Output bandwidth for Virtual Machines using a Single Root Input/Output Virtualization (SRIOV) adapter. The SRIOV adapter includes a plurality of virtual functions (VFs). Each individual virtual function (VF) is enabled to be explicitly assigned to a Virtual Machine (VM); and each of a plurality of VF teams is created with one or more VFs and is assigned to a VM. Each VF team is dynamically resizable for dynamic adjustment of Input/Output bandwidth.

In accordance with features of the invention, the Dynamic Resizable feature allows for dynamic adjustment of Input/Output bandwidth by either the expansion of the number of VFs or reduction of the number of VFs in a VF Team, for example, based upon actual usage patterns at run time.

In accordance with features of the invention, a Quality of Service (QoS) bandwidth allocated to a VF can be altered for one or more VFs in a VF Team based upon the current load on the VF Team. At run time the allocated QoS bandwidth for a VF Team can be increased or decreased by adjusting the QoS weight.

In accordance with features of the invention, the assignment of VFs to the VF teams is determined by a VF Team Manager and the assignments are communicated from the VF Team Manager to a hypervisor. The VF Team Manager optionally runs in a virtualization management console. The VF Team Manager communicates to various components, such as SRIOV PF Adapter Drivers, and Management Software. The VF Team Manager keeps track of which VFs are assigned to which VF Teams. The VF Team Manager periodically queries statistical data for VFs, PFs from the hypervisor and optionally decides whether to resize the VF Teams capacity in order to optimize the utilization of total bandwidth available, and based on user desired bandwidth allocations for a VF team allowing user configuration change.

In accordance with features of the invention, the VF Team Manager maintains memory data structures or internal memory maps including for example, VF Team to VF mappings, VFs to corresponding VF Team mappings, Adapter ID to PFs mappings, PFs to Adapter IDs mappings, VF Team to PFs mappings, PFs to VF Team mappings, and bandwidth allocation and bandwidth usage mappings of VFs, of VF Teams, of PFs, and of Adapters.

In accordance with features of the invention, the memory data structures or internal memory maps optionally are updated by periodically retrieving the statistical data from an adapter driver, based upon the events generated by an SRIOV Adapter Driver at run time for any changes, and based upon user configuration requests, for example, to create new VF Teams.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing dynamic adjustment of Input/Output bandwidth for Virtual Machines using a Single Root Input/Output Virtualization (SRIOV) adapters.

Figure 1:
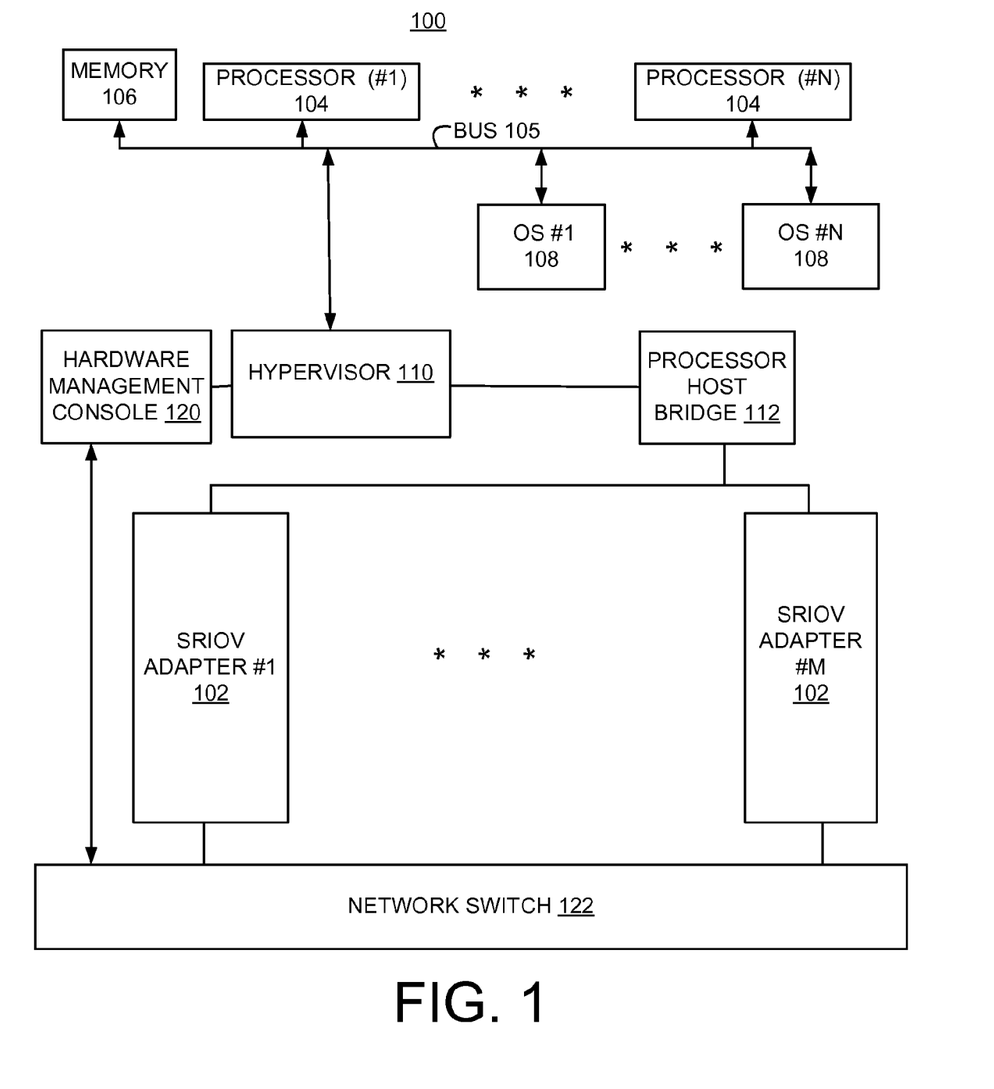
FIGS. 1 and 2 illustrate an example system for implementing dynamic adjustment of Input/Output bandwidth for Virtual Machines using Single Root Input/Output Virtualization (SRIOV) adapters in accordance with the preferred embodiment.
Figure 2:
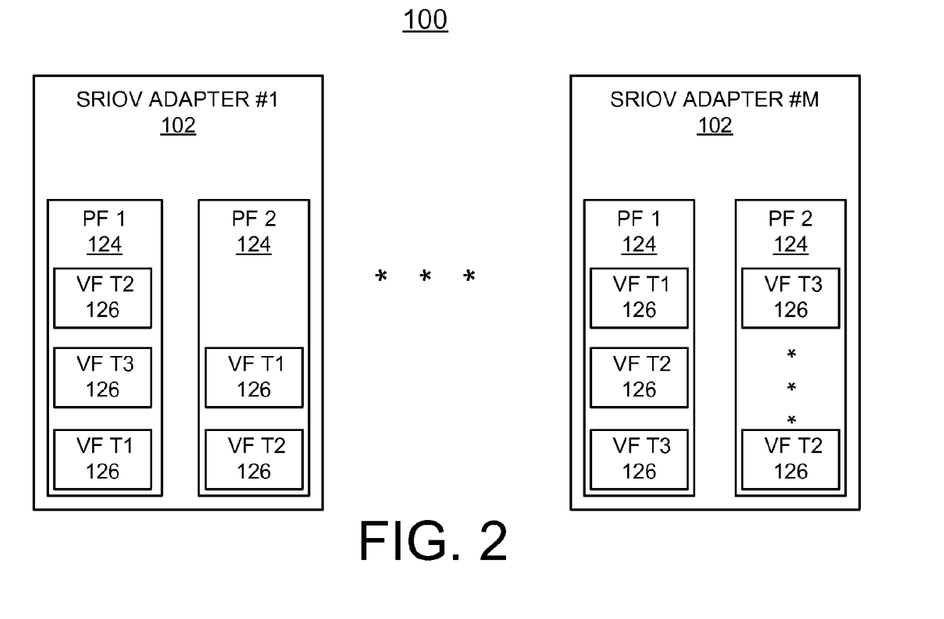

Having reference now to the drawings, in FIGS. 1 and 2, there is shown an example computer system generally designated by the reference character 100 for implementing dynamic adjustment of Input/Output bandwidth for Virtual Machines of Single Root Input/Output Virtualization (SRIOV) adapters 102 in accordance with a preferred embodiment.

Computer system 100 includes one or more processors, such as processor #1, 104 through processor #N, 104 or central processor units (CPUs) 104 coupled by a system bus 105 to a memory 106, a respective host operating system (OS) #1-#N, 108, and a hypervisor 110. The hypervisor 110 is a part of the system firmware, for example, managing the allocation of resources to each operating system #1-#N, 108. As shown, a processor host bridge (PHB) 112 connects the hypervisor 112 to the SRIOV adapters 102.

Computer system 100 optionally includes of multiple logical partitions partitioning of the multiprocessor computer system 100 into multiple independent servers, for example, each with one or more processors, main storage, and I/O devices. As shown, computer system 100 includes multiple processors 104 typical of a relatively large system; however, system 100 can include a single CPU 104.

As shown, computer system 100 includes a plurality of Single Root Input/Output Virtualization (SRIOV) adapters #1-#M, 102. Each SRIOV adapter 102 includes one or more physical functions (PFs), each PF typically including a plurality of virtual functions (VFs). As shown, a hardware management console (HMC) 120 used, for example, to manage various system functions is coupled to the hypervisor 110. A network switch 122 is connected between the hardware management console (HMC) 120 and the SRIOV adapters #1-#M, 102 via a network switch 122.

Referring to FIG. 2, additional example features of the computer system 100 are illustrated. Each SRIOV adapters #1-#M, 102 includes one or more physical functions (PFs) 124, for example each PF 124 including a set of virtual functions VFs 126. In FIG. 2, the VFs 126 support a VF team, which is a logical entity which can be assigned to a VM as a whole using existing technologies such as link aggregation, link bundling, or Network Interface Component (NIC) bonding/teaming. One of multiple teams T1-T3 is shown with respective VFs 126 in accordance with a preferred embodiment.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 3A:
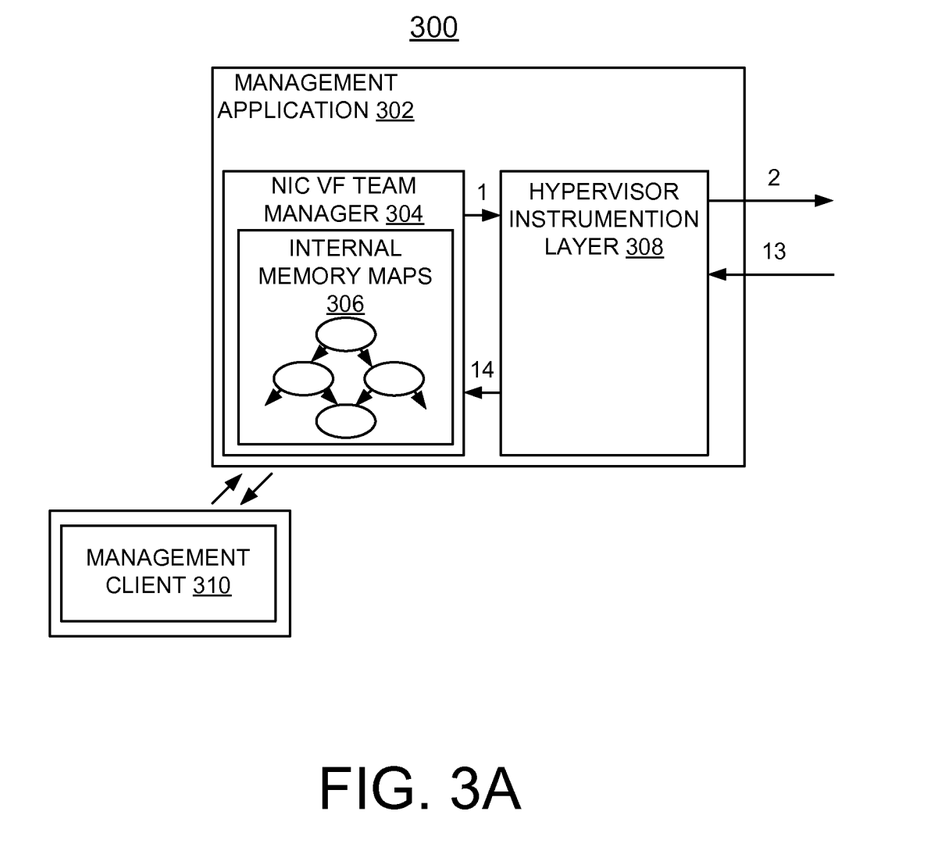
FIGS. 3A, and 3B illustrate example operational features for implementing dynamic adjustment of Input/Output bandwidth for Virtual Machines using the Single Root Input/Output Virtualization (SRIOV) adapters of FIGS. 1 and 2 in accordance with preferred embodiments.
Figure 3B:
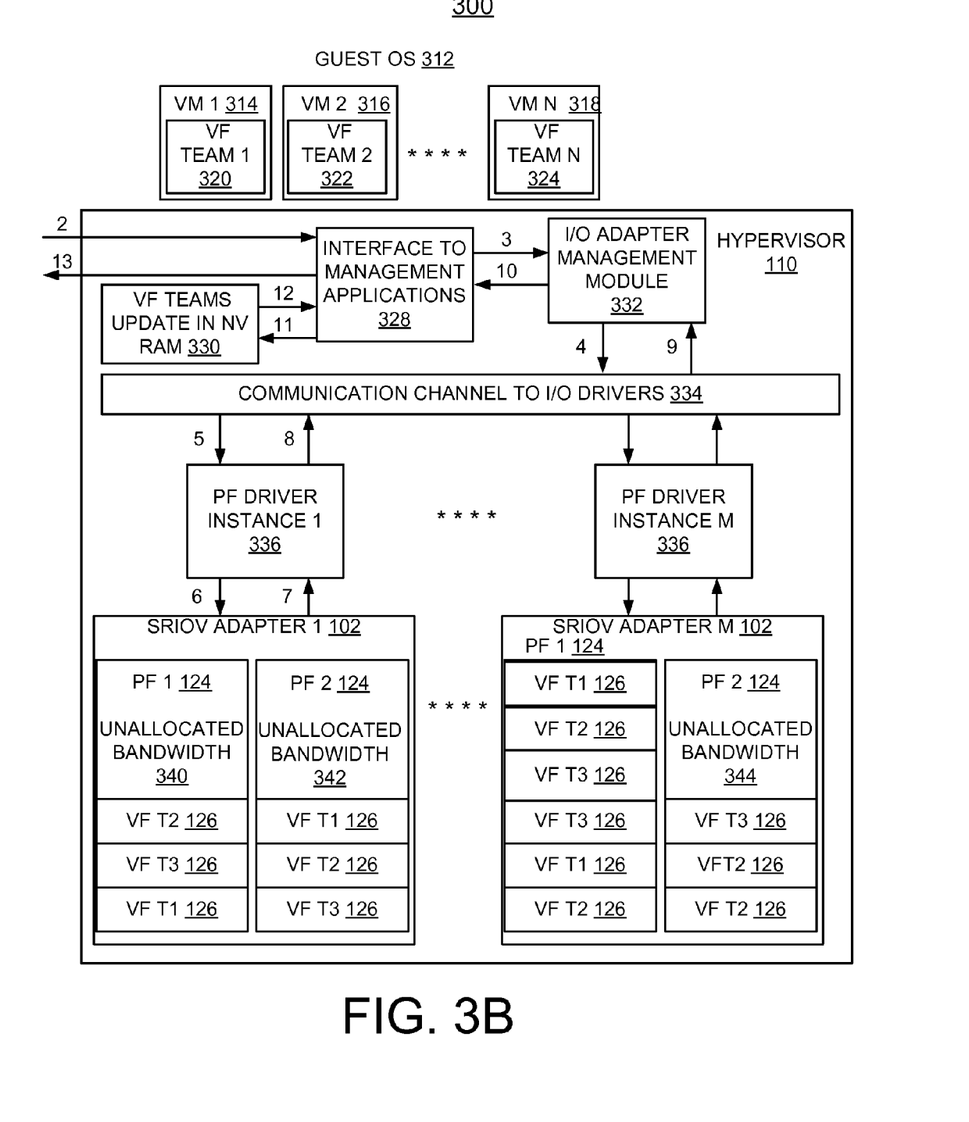

Referring to FIGS. 3A, and 3B, there are shown example system operational features generally designated by the reference character 300 for implementing dynamic adjustment of Input/Output bandwidth for Virtual Machines using the Single Root Input/Output Virtualization (SRIOV) adapters 102 in accordance with preferred embodiments.

In FIGS. 3A, and 3B, FIGS. 4A, and 4B, and FIG. 5, the same reference numbers are used for identical or substantially similar components including reference numbers used in FIGS. 1 and 2 for system 100. In each of the FIGS. 3A, and 3B, FIGS. 4A, and 4B, and FIG. 5, a sequence of flow of operations are indicated by number provided with flow lines between respective components.

FIGS. 3A, and 3B represent an example flow operations for querying VF Team data with the hypervisor 110 when the hypervisor is managed by a new Management Application, and when the hypervisor is rebooted followed by a discovery of VF Team data.

As shown in FIG. 3A, system operational features 300 include a management application 302 including a VF Team Manager 304 and internal memory maps 306 coupled to a hypervisor instrumentation layer 308. A management client 310 is coupled to the management application 302 for receiving user selections and communications. For example, the VF Team Manager 304 runs in the virtualization management console 120, and communicates to various components like SRIOV PF Adapter Drivers, Management Software, and the like. Basically, the VF Team Manager 304 keeps track of which VFs are assigned to which VF Teams. The VF Team Manager 304 periodically queries the statistical data for VFs, PFs from Hypervisor 110 and optionally decides whether to resize the VF Teams capacity in order to optimize the utilization of total bandwidth available. For each Hypervisor 110, the VF Team Manager 304 maintains various internal memory maps or data structures 306.

As shown in FIG. 3B, guest operating systems (OS) 312 are provided with a plurality of virtual machines VM 1, 314, VM 2, 316, VM N, 318, each including a respective VF Team 1, 320, VF Team 2, 322, VF Team N, 324, and the hypervisor 110. The SRIOV adapter 102 has an I/O adapter virtualization architecture that allows the single SRIOV adapter to be concurrently shared across many different virtual machines VM 1, 314, VM 2, 316, VM N, 318. System operational features 300 include an interface to management applications 328, coupled to VF Teams data in non-volatile (NV) random access memory (RAM) 330, and an I/O adapter management module 332. The I/O adapter management module 332 is coupled to a communication channel to I/O Drivers 334, which is coupled to a plurality of PF Driver Instances 1-M, 336, coupled to the respective SRIOV Adapters 1-M, 102. Each of the SRIOV Adapters 1-M, 102 include physical functions 1-2, 124, each including a set of virtual functions VFs 126 with various respective VF Teams 1-3. PF 1, 2, 124 of SRIOV Adapters 1, 102 include respective unallocated bandwidth 340, 342. PF 2, 124 of SRIOV Adapters M, 102 includes unallocated bandwidth 344 and the PF1, 124 of SRIOV Adapters M, 102 does not include unallocated bandwidth, as shown.

In accordance with features of the invention, all information related to VF Teams including the respective VF Team 1, 320, VF Team 2, 322, VF Team N, 324 is persisted in NVRAM (Non-Volatile Random Access Memory) area of Hypervisor 110, so that it is available across reboots of Hypervisor 110 or Management application 302. The VF Team Manager 304 component of Management Application 302 queries the VF Teams information from the Hypervisor's NVRAM 330 and keeps a copy of the information in its internal memory and any updates done to the VF Teams are updated in its internal memory maps 306 in parallel to Hypervisor's NVRAM 330. The VF Team Manager 304 keeps track of mapping between VFs to VF Teams and mapping between VF Teams to VMs. The VF Team Manager 304 keeps track of bandwidth allocations to VFs using its internal memory maps 306.

In accordance with features of the invention, VF Team Manager 304 monitors the bandwidth patterns for the whole VF Team by monitoring the statistics for each component VF and continually updates the internal maps. Also, appropriate internal maps are updated with bandwidth usage at individual VF level, PF level and Adapter Level. In addition, the internal maps for VF Team Memberships, that is which VFs are part of which VF Team, are updated based on any changes that takes place at run time.

As indicated at flow lines 1, and 2, VF Team Manager 304 communicates via the hypervisor instrumentation layer 308 to the interface to management applications 328. The interface to management applications 328 communicates with the I/O adapter management module 332 via communication channel to I/O Drivers 334 to a plurality of PF Driver Instances 1, 336 coupled to respective SRIOV adapters 1, 102, as indicated at flow lines 3, 4, 5, and 6. Response VF Team data is transferred from SRIOV adapter 1, 102 to the interface to management applications 328 via the PF driver instance 1, 336, communication channel to I/O Drivers 334, and the I/O adapter management module 332, as indicated at flow lines 7, 8, 9, and 10. VF Teams update in NV RAM 330 is provided, as indicated at flow lines 11, and 12. VF Team data is sent via the hypervisor instrumentation layer 308 to the VF Team Manager 304, as indicated at flow lines 13, and 14.

Figure 4A:
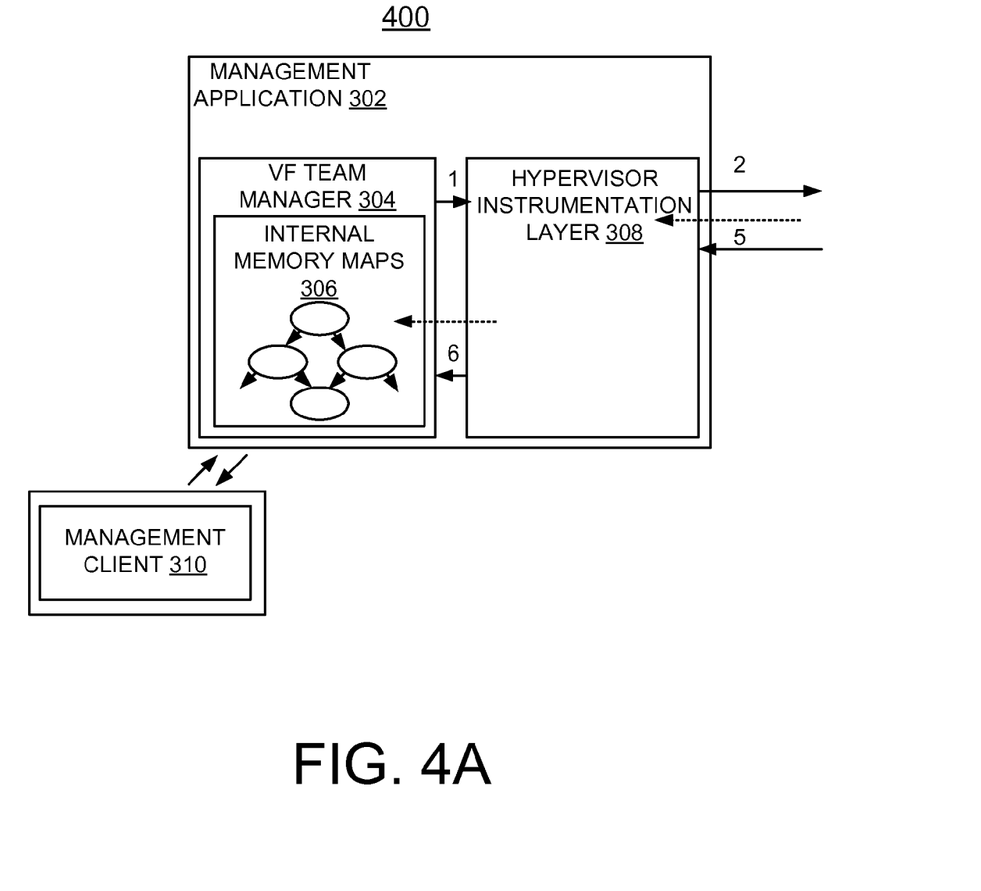
FIGS. 4A, and 4B illustrate further example operational features for implementing dynamic adjustment of Input/Output bandwidth for Virtual Machines using the Single Root Input/Output Virtualization (SRIOV) adapters of FIGS. 1 and 2 in accordance with preferred embodiments.
Figure 4B:
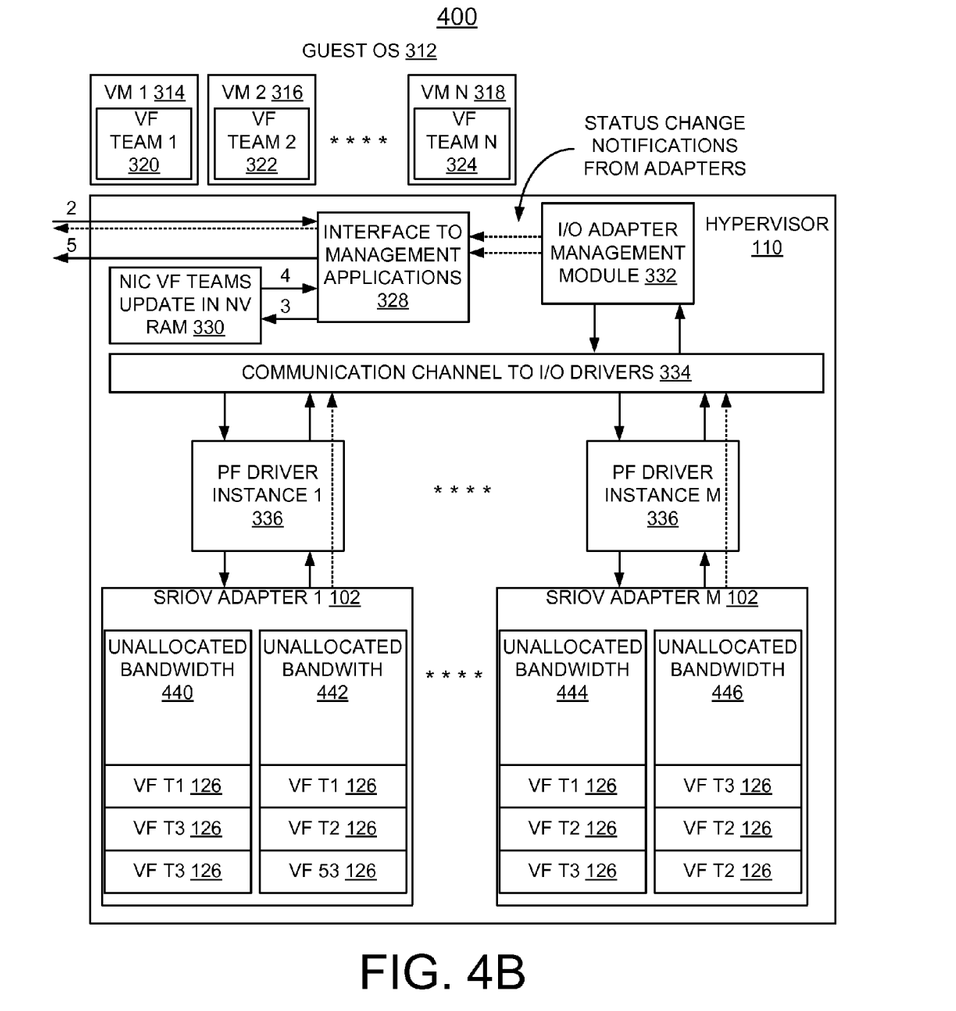

FIGS. 4A, and 4B represent an example flow of VF Team creation and update operations with the hypervisor 110 when a new VF Team is created and when an existing VF Team is updated, for example, altering bandwidth allocation for VFs, attaching new VFs, detaching existing VFs, and the like.

In accordance with features of the invention, VF Teams including respective VF Team 1, 320, VF Team 2, 322, VF Team N, 324 optionally are created based upon the number of SRIOV adapters chosen by the user or specific adapters chosen by the user. VF Team Manager 304 provides book keeping of VFs membership into VF Teams, tracking bandwidth allocations to VF Teams, and the like. Each of the VF Teams including respective VF Team 1, 320, VF Team 2, 322, VF Team N, 324 is a Dynamically Resizable VF Team conceptually similar to a Physical Team, while including enhanced features including being dynamic in nature. Each Dynamically Resizable VF Team including respective VF Team 1, 320, VF Team 2, 322, VF Team N, 324 is owned by a single VM of VMs 1-N, 314, 316, 318, and contains one or more SRIOV Virtual Functions (VFs) 126. The respective guest operating system (OS) 312 has visibility to individual VFs, and sees changes to the number of VFs 126 that is part of a VF Team, while the OS is transparent to the decision making process.

In accordance with features of the invention, each Dynamically Resizable VF Team including respective VF Team 1, 320, VF Team 2, 322, VF Team N, 324 consists of single MAC (media access component) and IP (Internet Protocol) Address irrespective of number of Virtual Functions present in the VF Team. Load balances and failover across multiple Virtual Functions are enabled for each Dynamically Resizable VF Team including respective VF Team 1, 320, VF Team 2, 322, VF Team N, 324, which can be expandable with new VFs at runtime, and can be shrinkable by reducing the number of VFs at runtime. Each Dynamically Resizable VF Team including respective VF Team 1, 320, VF Team 2, 322, VF Team N, 324 allows a reduction in the QoS bandwidth allocated to a VF in a given VF Team at run time, and allows an increase in the QoS bandwidth of a VF at run time. Each Dynamically Resizable VF Team including respective VF Team 1, 320, VF Team 2, 322, VF Team N, 324 allows migration of VFs from one VF Team to another VF Team dynamically; and allows reconciliation of multiple small VFs to a larger VF either with in a single Resizable VF Team or across Teams.

In accordance with features of the invention, a port label/sub-label functionality can be used as a means of categorizing VFs. The management application responsible for the selection and assignment of VFs to a VF Team can use the port label/sub-label to understand which VFs are candidates for a particular VF team. For example, the port label may be used to represent the specific switch a port is physically cabled to allowing the management application to select VFs cabled to the same switch if this were a requirement for the particular VF team.

Such a port label/sub-label functionality as described in U.S. Pat. No. 8,484,654 issued Jul. 9, 2013 to Charles S. Graham et al., and assigned to the present assignee can be used as a means of categorizing VFs. The subject matter of the above-identified U.S. Pat. No. 8,484,654 is incorporated herein by reference.

Referring to FIGS. 4A, and 4B, there are shown example system operational features generally designated by the reference character 400 for implementing dynamic adjustment of Input/Output bandwidth for VM 1, 314, VM 2, 316, VM N, 318 using the Single Root Input/Output Virtualization (SRIOV) adapters 102 in accordance with preferred embodiments. System operational features 400 shown in FIGS. 4A, and 4B includes the same reference numbers as used for identical or substantially similar components of system operational features 300 of FIGS. 3A, and 3B.

System operational features 400 further illustrates the SRIOV Adapters 1-M, 102 including physical functions 1-2, 124, each including a set of virtual functions VFs 126 with various respective VF Teams 1-3. Each of the illustrated PF 1, 2, 124 of SRIOV Adapters 1-M, 102 includes respective unallocated bandwidth 440, 442, 444, 446, as shown.

As indicated at flow lines 1, and 2, VF Team Manager 304 communicates via the hypervisor instrumentation layer 308 to the interface to management applications 328. VF Teams data in NV RAM 330 is provided, as indicated at flow lines 3, and 4. VF Team data is sent via the hypervisor instrumentation layer 308 to the VF Team Manager 304, as indicated at flow lines 5, and 6.

Figure 5:
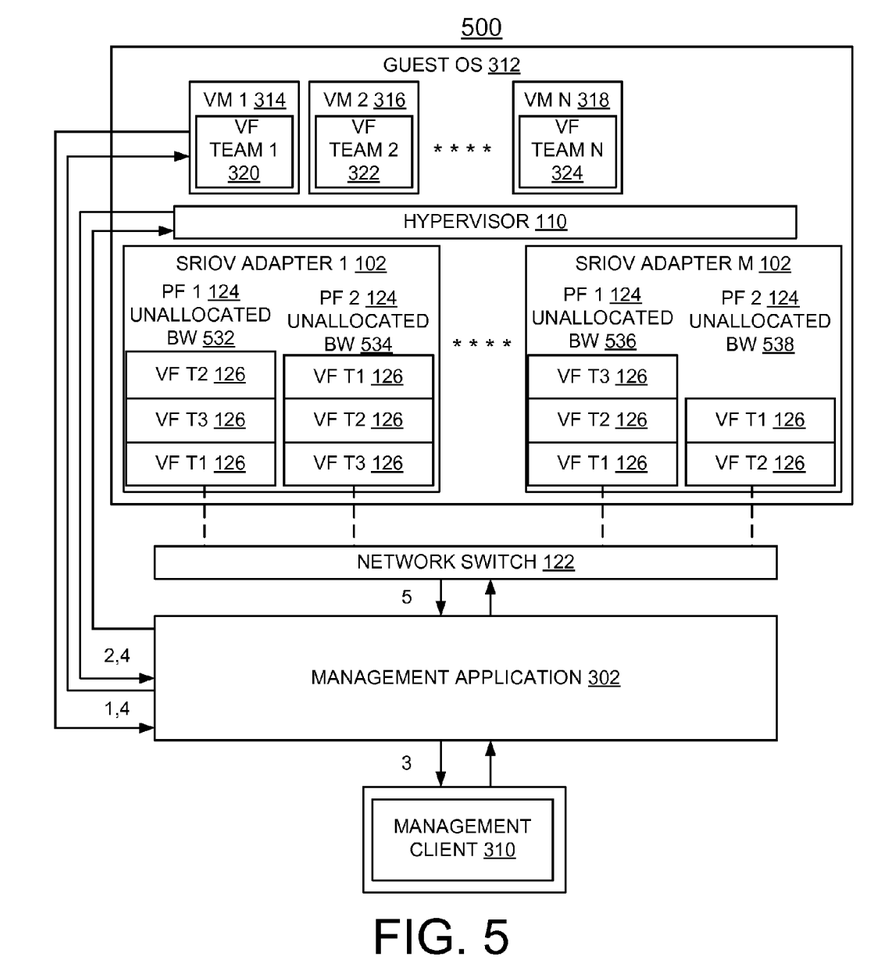
FIG. 5 illustrates example operational features for implementing dynamic adjustment of Input/Output bandwidth for Virtual Machines using the Single Root Input/Output Virtualization (SRIOV) adapters of FIGS. 1 and 2 in accordance with preferred embodiments.

Referring to FIG. 5, there are shown example system operational features generally designated by the reference character 500 for implementing dynamic adjustment of Input/Output bandwidth for Virtual Machines VM 1, 314, VM 2, 316, VM N, 318 using the Single Root Input/Output Virtualization (SRIOV) adapters 102 in accordance with preferred embodiments. System operational features 500 of FIG. 5 includes the same reference numbers as used for identical or substantially similar components of system operational features 300, 400 of FIGS. 3A, 3B, 4A, and 4B.

System operational features 500 illustrate communications for implementing user selections between the respective VM 1, 314, VM 2, 316, VM N, 318 and hypervisor 110 and the management application 302, as indicated at respective flow lines 1,4 and 2, 4. System operational features 500 illustrate communications between the management application 302 and the management client, as indicated at flow lines 3. Communications between the management application 302 and the network switch 122 are indicated at flow lines 5, with communication between the network switch 122 and SRIOV Adapters 1-M, 102, PF 1, 2, 124 each including respective unallocated bandwidth 532, 534, 536, and 538 for various VF Teams 126, as shown.

In accordance with features of the invention, the management application 302 gathers VF-level usage statistics from each VM 1, 314, VM 2, 316, VM N, 318. This is done, for example using a communication channel between the VM and Management Application, such as a known communication channel known as the RMC (Resource Monitoring and Control) mechanism used between the IBM Hardware Management Console and OSes within the IBM POWER Systems environment.

In accordance with features of the invention, the management application 302 gathers PF-level usage statistics from the hypervisor 110 for each physical adapter 102. This is done, for example using a communication mechanism between the hypervisor 102 and the Management Application 302 such as a known communication channel of the Hypervisor to Hardware Management Console interface within the IBM Power Systems environment.

In accordance with features of the invention, the management application 302 then makes dynamic decisions regarding the allocation of VFs to a VF team, or handles requests from system administrators creating or modifying the network resources. The management application 302 then initiates the allocation or movement of VFs through communications with the VMs and Hypervisor using the same communication channels as described above. A known example of this function is the DLPAR (Dynamic Logical Partitioning) operation for adding or removing VFs to an existing VM in the IBM POWER Systems environment. The management application 302 will then initiate the necessary switch configuration steps required for the VF Teaming mechanism. This can be done using known management interfaces which are standard in industry switches.

In accordance with features of the invention, the respective VF Teams 320, 322, 324 are created with one or more VFs 126 assigning respective VFs 126 to respective VMs 1-N, 314, 316, 318 at creation time or at run time. Creation of each Resizable VF Team is based on the following parameters: The bandwidth required, as per initial knowledge regarding application's I/O requirements, from Management Console 120, and management application 302.

The required bandwidth may also include a minimum I/O bandwidth, and this may be used to restrict a VM's maximum I/O bandwidth, such as with a development/test VM. The required bandwidth may also include a maximum I/O bandwidth, and this maybe used to guarantee a minimum I/O bandwidth for a respective VM 1-N, 314, 316, 318.

In accordance with features of the invention, adapter selection is provided with set options to choose related to the number of adapters 102 to use in the respective VF Team 1-N, 320, 322, 324. For example, a minimum number of adapters 102 may be desired to maintain redundancy for fault-tolerance purposes. In any of these cases, the VF Team Manager 304 will ensure the configured number of adapters is maintained throughout any dynamic I/O bandwidth changes within the VF Team. A user can choose the exact SRIOV adapters 102 from Management Console 120, or for example, a user can choose the minimum number of SRIOV adapters 102, and it may not be required to choose the exact adapters. Here, the VF Team Manager 304 will choose the required number of adapters 102 from the available adapters in the Hypervisor 110. Alternatively, the user neither chooses the adapters 102 nor the minimum number of adapters. In this case, the VF Team Manager 304 will choose the adapters 102 from the available adapters.

In accordance with features of the invention, adapter selection optionally is provided using profiles to describe the attributes of a VF Team assigned to a VM. The profile for a VF team includes additional factors, such as selecting adapters which are in different Input/Output (IO) drawers or different Central Electronics Complex (CEC) nodes for additional redundancy. The minimum and maximum bandwidth desired could also be included in the profile selection for a VF Team. The profile would then be associated with a logical port that a user assigned to the OS through a management application. Then the application layer of the OS will see a single entity, which is a set of teamed VFs, which fits the attributes of the assigned profile. This allows for a simplified means for a user to select the desired performance and resiliency attributes for the network interfaces to be provided to an OS.

In accordance with features of the invention, the VFs 126 are created on the adapters 102, chosen either by the user or by the system. The VFs 126 created on various adapters may not be of same capacity, but, their sum of bandwidths must be equal to the user specified bandwidth. The VF Team Manager 304 chooses the adapters 102 based on the current load on them from the in Memory Maps 306.

Figure 6:
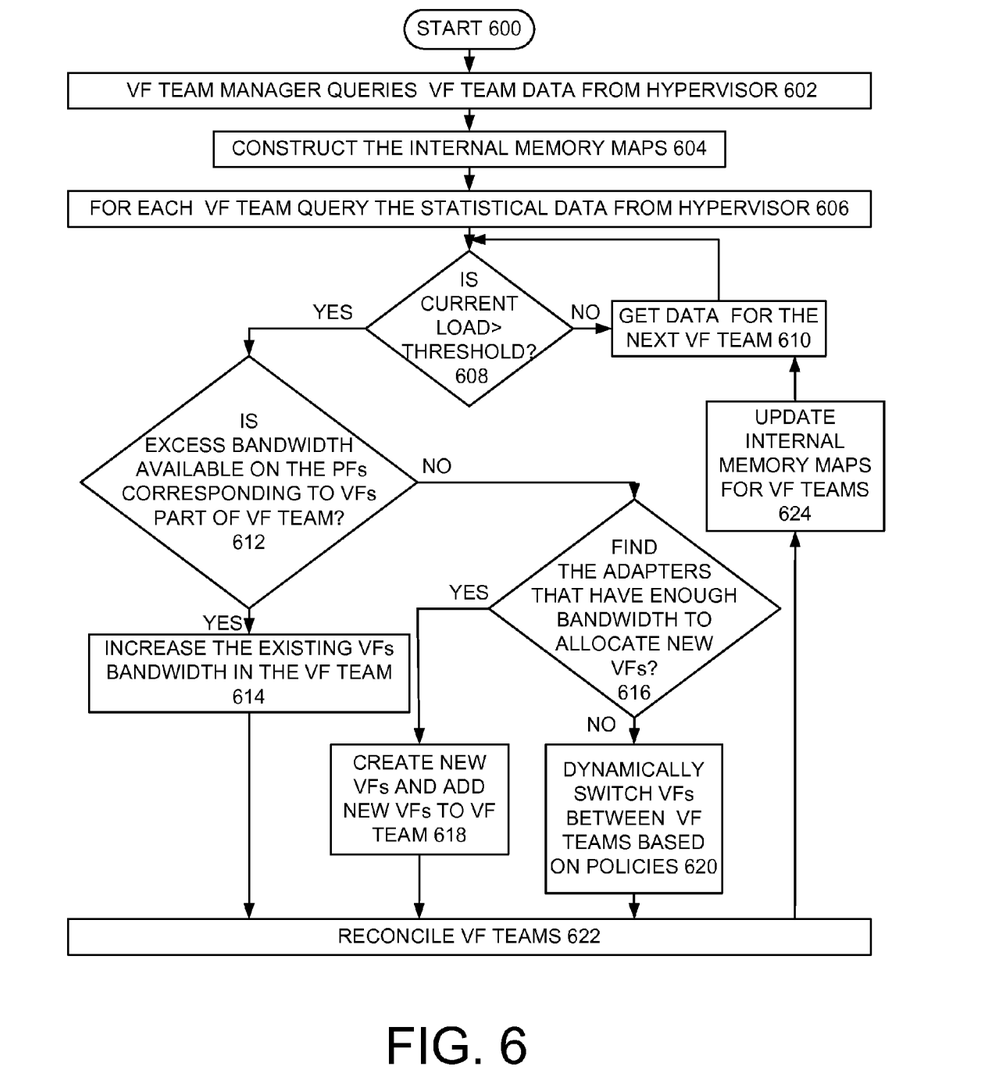
FIGS. 6 and 7 are flow charts illustrating example steps for implementing dynamic adjustment of Input/Output bandwidth for Virtual Machines using the Single Root Input/Output Virtualization (SRIOV) adapters of FIGS. 1 and 2 in accordance with preferred embodiments.
Figure 7:
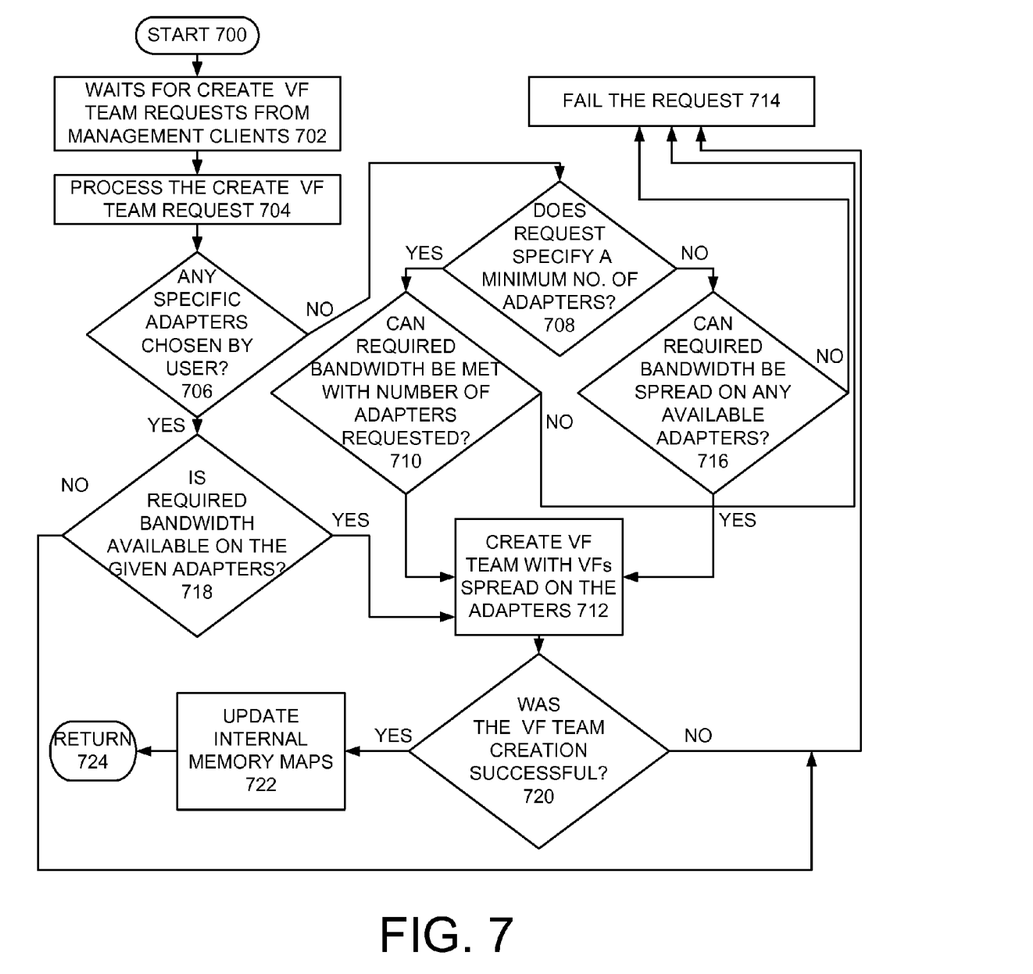

Referring to FIGS. 6 and 7, there are shown example steps for implementing dynamic adjustment of Input/Output bandwidth for Virtual Machines using the Root Input/Output Virtualization (SRIOV) adapter 102 in accordance with preferred embodiments.

In FIG. 6, operations begin as indicated in a block 600, the VF Team Manager 304 queries VF team data from the hypervisor 110 as indicated in a block 602. Internal memory maps 306 are constructed as indicated in a block 604.

In accordance with features of the invention, the VF Team Manager 304 maintains various internal memory maps or data structures 306 including VF Team to their VF Mappings, Adapter ID to PFs mappings and PFs to Adapter IDs mappings, PFs to VFs mappings and VFs to PFs mappings, VF Team to PFs mappings and PFs to VF Team mappings, VF Team to their VFs mappings and VFs to corresponding VF Team mappings. Internal memory maps or data structures 306 include bandwidth allocation and bandwidth usage mappings including an internal map of VFs to their allocated bandwidth, an internal map of VFs to their actual bandwidth usage by querying the statistics from Hypervisor 110, an internal map of VF Teams to their total allocated bandwidth, sum of bandwidths of their component VFs, an internal map of VF Teams to their actual bandwidth usage, sum of bandwidths usage of their component VFs, an internal map of PFs to their unallocated/free bandwidth, an internal map of PFs to their actual bandwidth usage, sum of bandwidth usages of the component VFs created from this respective associated PF, an internal map of Adapters to their unallocated/free bandwidth, and an internal map of Adapters to their actual bandwidth usage, sum of usage bandwidths of the component VFs created across all PFs from this respective adapter.

In accordance with features of the invention, the VF Team Manager 304 maintains various internal memory maps or memory data structures because it is faster to retrieve any of the above value from memory using Maps rather than querying Hypervisor on the fly and waiting for the response which will slow down the process.

In accordance with features of the invention, the internal memory maps 306 are updated, for example, as follows: Periodically retrieving the statistical data from adapter driver; based upon the events generated by the SRIOV Adapter Driver at run time for any changes; and based upon the user's configuration requests to create new VF Teams.

In accordance with features of the invention, VF Team Manager 304 allocates additional bandwidth to a given VF Team if the VF Team is heavily loaded. For example, a threshold value for each VF Team is defined, which either can be set by the user while configuring a VF Team or a default value will be set by the system 100, 300. For example, the threshold can be defined as 80% of total VF Team bandwidth, however a user is free to choose any value less than or equal to VF Team bandwidth. For example, the amount of load to increase is found for the VF Team that is the difference between a high threshold load value and an actual load. For example, the load increase value is converted into QoS units to be allocated, such as 1 Gig/sec=1 QoS Unit. VF Team Manager 304 dynamically de-allocates additional bandwidth to a given VF Team, while maintaining a minimum allowed bandwidth for the VF Team.

As indicated in a block 606, for each VF Team the VF Team Manager 304 queries the statistical data from the hypervisor. Checking whether the current load is greater than a threshold is performed as indicated in a decision block 608. If the current load is not greater than a threshold, then querying the statistical data from the hypervisor for the next VF Team is performed as indicated in a block 610. If the current load is greater than a threshold, then checking if excess bandwidth is available on the PFs corresponding to the VFs part of VF Team is performed as indicated in a decision block 612. If excess bandwidth is available on the PFs corresponding to the VFs part of VF Team, then the existing VFs bandwidth in the VF Team is increased as indicated in a block 614. If excess bandwidth is not available, then checking to find the adapters that have enough bandwidth to allocate new VFs is performed as indicated in a decision block 616. If any adapters are found that have enough bandwidth to allocate new VFs, then new VFs are created and added to the VF Team as indicated in a block 618. Otherwise if no adapters are found that have enough bandwidth to allocate new VFs, then VFs are dynamically switched between VF Teams based on predetermined policies as indicated in a block 620. Then the VF Teams are reconciled as indicated in a block 622, and internal memory maps for the VF Teams are updated as indicated in a block 624. Then querying the statistical data from the hypervisor for the next VF Team is performed as indicated in block 610.

In accordance with features of the invention, the policies implemented at block 620 are user defined or system defined to optimize the utilization of I/O resources in Hypervisors. When there are not enough I/O resources available on any of the I/O adapters 102 to increase QoS bandwidth for VFs, the VF Team Manager 304 executes the policies to switch VFs between VF Teams based on their utilization patterns. A policy to switch Virtual Functions between VMs can be based on opposite workload requirements. For example, VF Team Manager 304 monitors the traffic patterns for each VF Team by monitoring the statistics for their component VFs, such as bytes sent, received, peak rates and the like. Over a period of time, VF Team Manager 304 learns each VF Team's peak and normal bandwidth requirements along with periods in which those values are reached. Based on the bandwidth usage patterns and their durations, VMs are identified that have opposite peak and normal bandwidth requirements, that is one VM having minimum bandwidth requirement while another VM having maximum bandwidth requirement at the same time.

In accordance with features of the invention, the policies implemented at block 620 provide for reconciliation of multiple small VFs to a larger VF. For example, if within a single VF Team, there are too many VFs created from the same PF, then the VF Team Manager 304 merges some VFs whose total bandwidth will match the normal bandwidth requirements of the VM and the rest of the VFs can be left as is. These VFs can be the potential candidates for switching between different VF Teams. Reconciliation across VF Teams can be provided across VF Teams when there are too many VFs created from the same PF, then VF Team Manager 304 segregates the VFs within VF Teams appropriately to avoid scattering of VFs from a single PF across too many VF Teams. Reconciliation can be provided by co-locating the VFs to a single Adapter. This case is applicable when there is a need for adapter maintenance so that the VFs can be relocated to another adapter for a short duration of time. During reconciliation, the VF Team Manager 394 takes into consideration the configured minimum number of required adapters for a given VF Team for redundancy and failover purposes.

Referring to FIG. 7, operations begin as indicated in a block 700, the VF Team Manager 304 waits for create VF Team request form management clients 310 as indicated in a block 702. A create VF Team request is processed as indicated in a block 704. Checking for any specific adapters chosen by the user is preformed as indicated in a decision block 706. If no specific adapters were chosen by the user, then checking if the request specifies a minimum number of adapters as indicated in a decision block 708.

If the request specifies a minimum number of adapters at decision block 708, then checking if the required bandwidth can be met with the number of adapters requested is performed as indicated in a block 710. If the required bandwidth can be met with the number of adapters requested, the VF Team is created with the VFs spread on the adapters as indicated in a block 712. Otherwise if the required bandwidth can not be met with the number of adapters requested, the request is failed as indicated in a block 714.

If the request does not specify a minimum number of adapters at decision block 708, then checking if the required bandwidth can be met with available adapters is performed as indicated in a block 716. If the required bandwidth can not be met with available adapters, the request is failed at block 714. If the required bandwidth can be met with available adapters, the VF Team is created with the VFs spread on the available adapters at block 712.

If specific adapters chosen by the user at decision block 706, checking if the required bandwidth is available on the given adapters is performed as indicated in a decision block 718. If the required bandwidth can not be met with the specified adapters, the request is failed at block 714. If the required bandwidth can be met with available adapters, the VF Team is created with the VFs spread on the specified adapters at block 712.

After the VF Team is created at block 712, checking if the VF Team creation was successful is performed as indicated in a decision block 720. If the VF Team creation was not successful, the request is failed at block 714. As indicated in a block 724, if the VF Team creation was successful then the operations return to block 702 to wait for a next create VF Team request.

Figure 8:
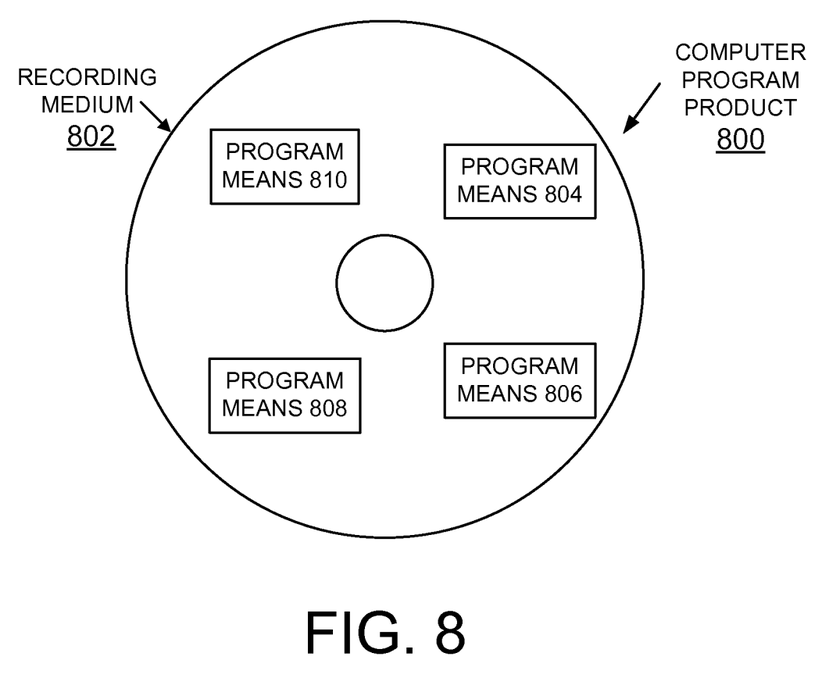
FIG. 8 is a block diagram illustrating a computer program product in accordance with the preferred embodiment.

Referring now to FIG. 8, an article of manufacture or a computer program product 800 of the invention is illustrated. The computer program product 800 is tangibly embodied on a non-transitory computer readable storage medium that includes a recording medium 802, such as, a floppy disk, a high capacity read only memory in the form of an optically read compact disk or CD-ROM, a tape, or another similar computer program product. Recording medium 802 stores program means 804, 806, 808, and 810 on the medium 802 for carrying out the methods for implementing dynamic adjustment of Input/Output bandwidth for Virtual Machines of preferred embodiments in the system 100 of FIGS. 1 and 2.

A sequence of program instructions or a logical assembly of one or more interrelated modules defined by the recorded program means 808, 806, 808, and 810, direct the computer system 800 for implementing adjustment of Input/Output bandwidth for Virtual Machines of an I/O adapter, such as a Single Root Input/Output Virtualization (SRIOV) adapter of a preferred embodiment.

While the present invention has been described with reference to the details of the embodiments of the invention shown in the drawing, these details are not intended to limit the scope of the invention as claimed in the appended claims.

What is claimed is:

1. A method for implementing dynamic adjustment of Input/Output bandwidth for Virtual Machines using a Single Root Input/Output Virtualization (SRIOV) adapter comprising:
providing the SRIOV adapter with a plurality of physical functions (PFs), wherein each PF containing a plurality of virtual functions (VFs), each individual virtual function (VF) enabled to be explicitly assigned to a Virtual Machine (VM);
enabling each individual virtual function (VF) to be explicitly assigned to a Virtual Machine (VM);
creating each of a plurality of VF teams with one or more VFs, each of the plurality of VF teams assigned to one of the Virtual Machines, each of the plurality of VF Teams indicating a plurality of VFs contained in a plurality of PFs, wherein each VF has a bandwidth and each VF team has a respective sum of bandwidth associated with their respective VFs;
enabling the VF teams to be dynamically resizable for dynamic adjustment of the Input/Output bandwidth for the Virtual Machines by dynamically adjusting, at different run time points, I/O bandwidth for Virtual Machines of the SRIOV adapter based upon actual usage patterns at run time;
tracking membership information about VF Team to VF mappings and PFs to VF Team mappings in an internal memory map, and periodically querying team usage data, from said hvpervisor for each VF team to compare current team usage of bandwidth with a threshold for each VF team;
for each VF team:
dynamically adjusting the I/O bandwidth for the Virtual Machines by:
determining whether a current load of the VF Team is greater than the threshold:
responsive to the current load of the VF team being is not greater than the threshold, checking if a set of physical functions (PF set) has excess bandwidth;
responsive to determining that a PF of the PF set has available excess bandwidth, increasing VF bandwidth within the respective VF team, wherein the increasing is performed by:
allocating a new VF, wherein the new VF has more bandwidth than a corresponding VF function within the VF Team; and
reconciling the new VF and the corresponding VF by replacing the corresponding VF with the new VF for the respective VF Team;
responsive to determining that excess bandwidth is not available, finding a second different SRIOV adapter having enough available bandwidth to increase the bandwidth of the respective VF team:
responsive to the second SRIOV adapter being found and having enough available bandwidth to increase the bandwidth of the VF Team, increasing the bandwidth of the VF Team by performing:
allocating a new VF on the second SRIOV adapter, wherein the new VF has more bandwidth than a corresponding VF function within the VF Team; and
reconciling the new VF and the corresponding VF by replacing the corresponding VF with the new VF for the respective VF Team;
responsive to no SRIOV adapters found having enough bandwidth, dynamically switching VFs between different VF teams by:
identifying a second VF team having a new VF having more bandwidth than a corresponding VF function within the VF Team; and
reconciling the new VF and the corresponding VF by switching the corresponding VF with the new VF for the respective VF Team, wherein the second VF team has the corresponding VF and the respective VF Team has the new VF;
and
updating the internal memory maps for the plurality of VF Teams.

2. The method as recited in claim 1, and wherein enabling the VF teams to be dynamically resizable is responsive to a user configuration change.

3. The method as recited in claim 1, wherein enabling the VF teams to be dynamically resizable includes enabling dynamic adjustment of Input/Output bandwidth by either the expansion of a number of VFs or reduction of the number of VFs in a predefined VF Team based upon actual usage patterns at run time.

4. The method as recited in claim 1, wherein enabling the VF teams to be dynamically resizable includes enabling an allocated Quality of Service (QoS) bandwidth for a predefined VF to be altered for one or more VFs in a predefined VF Team based upon the current load upon the VF Team.

5. The method as recited in claim 1, wherein enabling the VF teams to be dynamically resizable includes, at run time, increasing or decreasing an allocated Quality of Service (QoS) bandwidth for each VF Team by adjusting a QoS weight.

6. The method as recited in claim 1, includes providing a VF Team Manager to determine the assignment of VFs to the VF teams and to communicate the assignment to a hypervisor.

7. The method as recited in claim 1, includes providing a VF Team Manager to periodically query statistical data for VFs, and each physical function (PF) from the hypervisor to decide whether to resize the VF Teams capacity in order to optimize the utilization of total bandwidth available.

8. The method as recited in claim 1, includes providing a VF Team Manager to maintain internal memory maps including VF Team to VF mappings, PFs to VF Team mappings, bandwidth allocation mappings, and bandwidth usage mappings of VFs, of VF Teams, of PFs, and of Adapters.

9. The method as recited in claim 1, includes providing a VF Team Manager to update the internal memory maps by periodically retrieving statistical data from an adapter driver.

10. The method as recited in claim 1, includes providing a VF Team Manager to update the internal memory maps based upon events generated by an SRIOV Adapter Driver at run time for any changes, and based upon user configuration requests to create new VF Teams.

* * * * *